Figure 1:
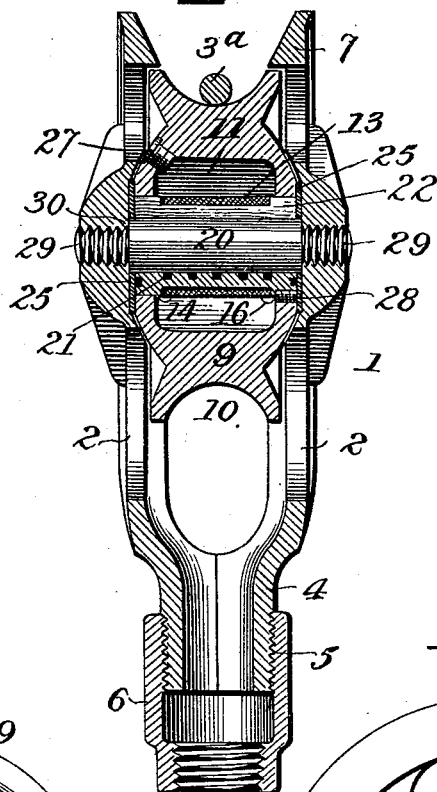

(No Model.)

E. M. TOUSLEY.
TROLLEY.

No. 520,973. Patented June 5, 1894.

Witnesses
Jno. G. Hinkel
A. N. Dobson

Inventor
Edgar M. Tousley
By Foster Freeman
Attorneys

THE NATIONAL LITHOGRAPHING COMPANY,
WASHINGTON, D. C.

UNITED STATES PATENT OFFICE.

EDGAR M. TOUSLEY, OF JAMESTOWN, NEW YORK.

TROLLEY.

SPECIFICATION forming part of Letters Patent No. 520,973, dated June 5, 1894.

Application filed January 9, 1894. Serial No. 496,272. (No model.)

*To all whom it may concern:*

Be it known that I, EDGAR M. TOUSLEY, a citizen of the United States, residing at Jamestown, Chautauqua county, State of New York, have invented certain new and useful Improvements in Trolleys, of which the following is a specification.

This invention relates to certain new and useful improvements in trolleys for electric railway systems; and it consists substantially in such features of construction, arrangement, and combinations of parts as will hereinafter be more particularly described.

As ordinarily constructed a trolley is usually provided with some means of lubrication in order to protect the bearings or movable parts from wear, and attempts have been made to obviate frequent filling or supplying of the lubricant on account of the inconvenience and loss of time entailed.

In some instances it has been usual to provide an oil supply chamber around the hub or central bearing of the trolley-wheel, from which chamber the oil is allowed to flow or feed to the parts to be lubricated. In other instances it has been the practice to employ a central bushing or bearing having interior cells or grooves in which is contained a material such as plumbago or graphite, which constitutes the anti-friction or lubricating material and which is caused to become disseminated or spread over the surfaces of the moving or working parts by the frictional rubbing or contact of the latter when the trolley is in operation. Both of the ways referred to fully meet the requirements as long as the lubricant lasts, but inasmuch as the capacity of a trolley for containing a very large quantity of lubricant at any one time is necessarily limited or restricted by its size, it is evident that frequent replenishing is necessitated. I have discovered that the occasion of frequent replenishing is due principally to the fact that the feed of the lubricant to the working parts is always in excess of that which is actually required in use, with the result that much of the lubricant is wasted without any benefits being derived therefrom whatever.

Recognizing the inconvenience and disadvantages to be overcome I have adopted a construction embodying both a liquid lubricant, such as oil, and a semi-plastic material, such as graphite or plumbago, and, as hereinafter more fully will appear, when the trolley has been once properly filled or supplied with both of these materials or substances the said trolley can be used until entirely worn out, without having to replenish either of the lubricants. The use of the two substances or materials by slow admixture has been found to be superior to the use of either of them alone, and by my arrangement there can be no possible waste or overflow or excessive feed thereof. By my construction also I overcome other defects which have heretofore been encountered, and the several parts of my improved trolley can be easily and cheaply made, and very quickly put together or united.

Figure 2:
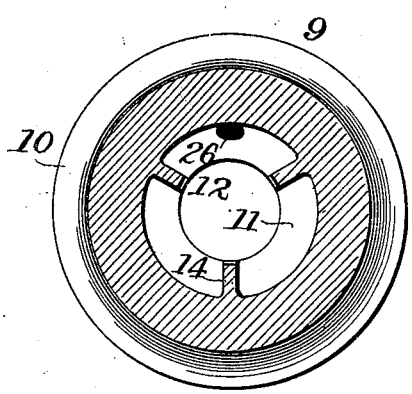
Figure 5:
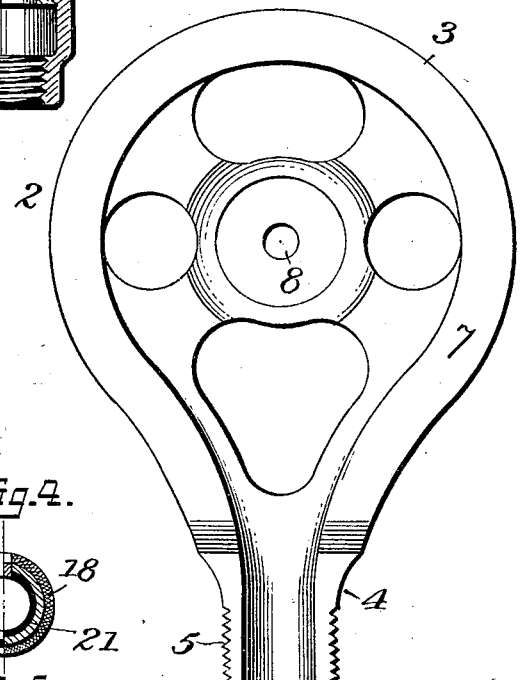
Figure 3:
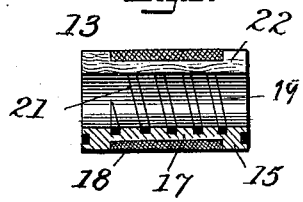
Figure 4:
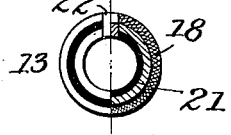
Figure 6:
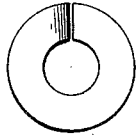

In the accompanying drawings: Figure 1, is a vertical sectional elevation of a trolley embodying my invention. Fig. 2, is an enlarged transverse sectional view taken through the trolley wheel so as to more clearly indicate the construction of oil or lubricating chamber. Fig. 3, is a longitudinal, sectional view of the central bushing; and Fig. 4, is an end view thereof, partly in section so as to more clearly indicate the construction thereof. Fig. 5, is an enlarged view of one of the removable sides of the wheel supporting frame or yoke. Fig. 6, is a plan view of a washer or split ring employed on the ends of the central bearing-pin between the sides of the trolley wheel and the inner sides of the removable side pieces of the supporting frame or yoke.

In carrying my invention into effect I provide a wheel supporting frame or yoke which is constructed of two counterpart sections and which are screwed upon the ends of the central bearing pin in such manner as to embrace between them the trolley wheel which is free to rotate in the desired manner when passing along the usual trolley wire employed in electric systems of railway. The trolley wheel itself is constructed in the main with a central oil or lubricating chamber, and, passing centrally through the chamber and the sides of the wheel is a bushing or bearing which is of peculiar construction, and which serves to receive and support the central bearing pin. The several parts will be more specifically referred to hereinafter by the several designating numerals employed therefor.

Referring to the drawings 1, represents my improved trolley-wheel support or yoke, the same being constructed of two counterpart detachable sections 2, 2, each having an enlarged approximately circular portion 3, and terminating at its lower end with a shank portion 4, as shown. The said shank portions branch or curve slightly inward from the enlarged portions 3, 3, so as to come together and unite in forming a stem which is round in shape and which is screw-threaded on its exterior as shown at 5, so as to receive a correspondingly threaded coupling sleeve 6, which receives in its lower end the usual pole or rod, (not shown) which supports a trolley from the top of a car or other vehicle. The inward bend or curve thus given to the two sides or sections of the said wheel-support or yoke causes the enlarged portions 3, 3, thereof to be set apart sufficiently to accommodate or receive between them the trolley wheel and to permit a free and uninterrupted working of the latter. The said enlarged portions 3, 3, are each slightly dished as shown to partially receive the side rims of the wheel and they are finished off even or flanged at 7, so as to lend additional strength. These sides or sections of the frame or yoke are preferably also made of open-work instead of solid, for the purpose of lightness. They are also each provided centrally of the enlarged portions 3, 3, with a screw threaded opening 8, so as to enable them to be screwed upon the projecting ends of the central bearing pin for the wheel hereinafter referred to. The said enlarged portions furthermore by extending beyond the periphery of edges of the wheel serve as guards to retain the latter in proper position upon the trolley wire 3ª, and prevent displacement of said wheel from said wire. The wheel 9, is provided with a continuous groove 10 in its periphery to enable it to pass over the usual trolley wire of a system through which an electric current is conducted. As distinguished from other trolley wheels, however, the said wheel 9, is provided in its body with a central chamber 11, for oil or other similar liquid lubricant, while in each of its sides is a central circular opening 12, for receiving and supporting oil-tight the ends of a central bushing or bearing 13, which extends all the way through the wheel or oil chamber. The said central oil chamber is formed or provided with a number of ribs or blades 14, for insuring inward flow of oil and which project inwardly and across the chamber not quite to the edge of the circular openings in the sides of the wheel, so as to leave a small space between the same and the central bushing or bearing referred to. The centrifugal action imparted to the oil in the chamber by the rotation of the wheel tends of course to throw or carry the oil outwardly or away from the sides of the central bushing or bearing, but the ribs or blades 14, break up or destroy this centrifugal action with the result that the oil flows down the sides of the blades in continuous small films or streams. Moreover the blades overcome the tendency of the lubricant to settle at the lower portion of the wheel when stationary, without coming in contact with the central bushing. In some instances to facilitate the proper feed of the oil around the exterior of the central bushing or bearing I preferably form small notches 16, in the blades at the edges, but this is not absolutely necessary. The said central bushing or bearing 13, as stated, passes through the oil chamber, and is supported by its ends in the central openings in the sides of the wheel. This central bushing or bearing is constructed of any suitable metal and a greater portion of its body is contracted or reduced in size as shown at 17, so as to accommodate a covering or packing 18, of some porous substance or material such as felt, and thus the ends thereof are enlarged thereby as shown at 15. The said bushing is bored out centrally as shown at 19, so as to receive the bearing pin 20, and interiorly it is formed or provided with grooves or notches which receive and hold a lubricating substance or material, such as plumbago or graphite, indicated at 21. Preferably these grooves or notches extend in a spiral direction as shown, but it is evident that they could extend in straight lines or in any other suitable direction. For its entire length the bushing or bearing is split or cut out and a porous body 22, such as wood is inserted between the longitudinal edges thereof. Such porous body might be some other equivalent material but in order to secure a body combining hardness and strength with a sufficient degree of porosity, I prefer to employ wood, such for instance as maple on account of the crossed nature of its grain. The purpose of the body of wood is to feed by slow process the oil from chamber 11, to the interior of the central bushing where it becomes admixed with the plumbago or graphite and the two thus aid in reducing friction and wear in a manner vastly superior to the action of either of the substances alone. The block of wood extends the whole length of the bushing and thus evenly supplies the parts throughout; while the felt or other body which surrounds the bushing is kept constantly soaked with oil and keeps up a continuous even supply to the wood by capillarity. It will thus be seen that while no more than a given quantity of oil can ever pass through or penetrate the wood at one time, this quantity is always and invariably supplied. The block of wood furthermore maintains the strength of the bushing, and the arrangement or embodiment which I have shown and described effects the desired objects in a thorough and complete manner. It will be seen that only a gradual and limited quantity of oil can be fed from the chamber 11, and that any excess or overflow thereof will be either absorbed by the felt or be compelled to return to the chamber.

In addition to providing the interior of the bushing with cavities or grooves for holding the graphite or plumbago I also cut or otherwise form in the end faces of said bushing other similar grooves, as shown, and fill them also in like manner with the same or a similar substance, so that this substance will, at such points, commingle with the slight quantity of oil which is gradually fed out of the end-faces of the interposed block of wood, and thereby serve to prevent friction and wear between the sides of the wheel and the washers 25, which are held on the projecting ends of the central bearing pin 20, as shown. The central chamber 11, it should be remarked is provided in one side with a filling opening 26, which is closed by a suitable plug or screw 27; and the central bushing is held in the wheel and prevented from turning by means of a screw 28, which enters partly into the material of the bushing at one end and partly into the side wall of the oil chamber, as shown. The central bearing pin 20, passes through the bushing, and its projecting ends are screw-threaded at 29, to be received into the central screw-threaded openings, 8, 8, formed in the enlarged portions of the detachable sections of the support or holder 1, for the wheel. Surrounding the said projecting ends of the bearing pin are the split rings or spring washers 25, 25, which when the two sides or counterpart sections 2, 2, are screwed down in place preserve a certain degree of elasticity between the parts and at the same time maintain a close connection. The screw threaded ends 29, of the pin are somewhat reduced in diameter, thus leaving shoulders 30, which prevent the parts being screwed up so tight as would impede the proper action or working of the wheel, and at the same time insures the rigidity of the entire construction.

From the foregoing description it will be seen that a trolley embodying my construction and arrangement is compact in form, secure and strong, and besides having no projecting, interfering portions. It will also be seen that the same is simple in construction, easily united or put together, and one part readily replaced by another corresponding thereto should the first become broken, twisted, or distorted.

By my construction the wheel is quickly and easily placed or inserted into position, and the same can be quickly and easily removed whenever desired for any purpose whatever.

The construction and arrangement of lubricating devices do not permit any waste or excess of feeding of the lubricants and every particle thereof is fully utilized. Practical tests have demonstrated that the supply of lubricant will outlast the natural life of wear of the wheel proper, while the bearings remain practically intact or unworn.

It will still further be seen that my improved form of wheel-support or yoke is applicable to other forms of wheel and lubricating devices, and also that the latter are not specially or exclusively adapted for use in connection with my particular support. Thus the wheel and lubricating devices could be used in other forms of supports, and vice versa; and besides, other changes could be resorted to without departing from the spirit of my invention.

Therefore, without limiting myself to the precise details of construction and arrangements of parts shown, I claim—

1. The wheel having a chamber containing a liquid lubricant, a bushing containing a semi-plastic lubricant, and an interposed porous body feeding the liquid lubricant to the semi-plastic lubricant between the bearing surfaces, substantially as shown and for the purpose set forth.

2. The wheel having a chamber containing a liquid lubricant and provided with means for insuring the inward flow of the liquid, a bushing containing a semi-plastic lubricant, and an interposed porous body feeding the liquid to the semi-plastic lubricant between the bearing surfaces, substantially as shown and for the purpose set forth.

3. The wheel having a chamber containing a liquid lubricant, a bushing containing a semi-plastic lubricant, and a porous body interposed in the wall of the bushing and feeding the liquid to the semi-plastic lubricant between the bearing surfaces, substantially as shown and for the purpose set forth.

4. The wheel having a chamber containing an oil lubricant, a bushing provided with interior cavities or grooves containing a semi-plastic lubricant, as plumbago, and a block of wood interposed in the body or wall of the bushing and feeding the oil to the plumbago between the bearing surfaces, substantially as shown and for the purpose set forth.

5. The wheel having a chamber containing a liquid lubricant, a bushing provided internally and on its outer end faces with cavities or grooves containing a semi-plastic lubricant, and an interposed body of wood extending lengthwise of the bushing and feeding the liquid to the semi-plastic lubricant between the bearing surfaces, substantially as shown and for the purpose set forth.

In testimony whereof I have signed my name to this specification in the presence of two subscribing witnesses.

EDGAR M. TOUSLEY.

Witnesses:
 F. L. FREEMAN,
 W. CLARENCE DUVALL.